(12) United States Patent
Steffey et al.

(10) Patent No.: US 9,544,768 B2
(45) Date of Patent: Jan. 10, 2017

(54) METHOD AND APPARATUS FOR PERFORMING SECURE BLUETOOTH COMMUNICATION

(71) Applicants: Hyundai America Technical Center, Inc., Superior Township, MI (US); Hyundai Motor Company, Seoul (KR); Kia Motors Corporation, Seoul (KR)

(72) Inventors: Joseph Steffey, Superior Township, MI (US); Mustafa Saed, Superior Township, MI (US)

(73) Assignees: Hyundai Motor Company, Seoul (KR); Kia Motors Corporation, Seoul (KR); Hyundai America Technical Center, Inc., Superior Township, MI (US)

( * ) Notice: Subject to any disclaimer, the term of this patent is extended or adjusted under 35 U.S.C. 154(b) by 56 days.

(21) Appl. No.: 14/664,203

(22) Filed: Mar. 20, 2015

(65) Prior Publication Data

US 2016/0277923 A1 Sep. 22, 2016

(51) Int. Cl.
*H04W 12/04* (2009.01)
*H04L 29/08* (2006.01)
*H04L 29/06* (2006.01)

(52) U.S. Cl.
CPC .......... *H04W 12/04* (2013.01); *H04L 63/0823* (2013.01); *H04L 67/12* (2013.01)

(58) Field of Classification Search
CPC ...... H04W 12/04; H04L 67/12; H04L 63/0823
See application file for complete search history.

(56) References Cited

U.S. PATENT DOCUMENTS

2014/0270172 A1* 9/2014 Peirce .................. H04L 9/0819
380/270
2014/0310515 A1 10/2014 Kim et al.

FOREIGN PATENT DOCUMENTS

| KR | 10-2002-0040378 | 5/2002 |
| KR | 10-2013-0019358 | 2/2013 |
| KR | 10-2013-0021774 | 3/2013 |
| KR | 10-2014-0083850 | 7/2014 |

* cited by examiner

*Primary Examiner* — Kristy A Haupt
(74) *Attorney, Agent, or Firm* — Mintz Levin Cohn Ferris Glovsky and Popeo, P.C.; Peter F. Corless

(57) ABSTRACT

A method for performing secure Bluetooth communication between a vehicle terminal and a user terminal is provided. The method includes: transmitting a user terminal inverse certificate request message to an authority server; receiving a message from the authority server in response to the transmission of the user terminal inverse certificate request message; obtaining a user terminal inverse certificate from the message received from the authority server; receiving a vehicle terminal inverse certificate from the user terminal in exchange for the user terminal inverse certificate; validating the vehicle terminal inverse certificate; pairing with the user terminal when the vehicle terminal inverse certificate is validated; and performing Bluetooth communication with the paired user terminal.

21 Claims, 6 Drawing Sheets

METHOD AND APPARATUS FOR PERFORMING SECURE BLUETOOTH COMMUNICATION

TECHNICAL FIELD

The present disclosure relates to a method and an apparatus for performing secure Bluetooth communication.

BACKGROUND

Recently, Bluetooth communication between a vehicle terminal and a user terminal, such as a smart phone, has been widely utilized, such as playing a playlist of songs stored on the smart phone through the vehicle's audio stereo system, or providing a voice call through a vehicle speaker. As long as security is ensured in Bluetooth communication, the vehicle terminal will be able to utilize additional information via the smart phone, such as personal information for providing customized services to users in their vehicles, which otherwise would not be available. Therefore, it is necessary to ensure security in the Bluetooth communication between the vehicle terminal and the smart phone.

SUMMARY

Accordingly, the present disclosure has been made to solve the above-mentioned problems occurring in the related art while advantages achieved by the related art are maintained intact.

One object to be achieved by the present disclosure is to provide a method and an apparatus for performing secure Bluetooth communication. Another object to be achieved by the present disclosure is to provide a computer readable recording medium in which a program for allowing a computer to execute the method is recorded. The technical problem to be solved by embodiments of the present disclosure is not limited to the technical problems as described above, and therefore other technical problems may be solved.

According to embodiments of the present disclosure, a method for performing secure Bluetooth communication includes: transmitting, by a vehicle terminal, a user terminal inverse certificate request message to an authority server; receiving, at the vehicle terminal, a message from the authority server in response to the transmission of the user terminal inverse certificate request message; obtaining, by the vehicle terminal, a user terminal inverse certificate from the message received from the authority server; receiving, at the vehicle terminal, a vehicle terminal inverse certificate in exchange for the user terminal inverse certificate from the user terminal; validating, by the vehicle terminal, the vehicle terminal inverse certificate; pairing, by the vehicle terminal, with the user terminal when the vehicle terminal inverse certificate is validated, and performing, by the vehicle terminal, Bluetooth communication with the paired user terminal.

Furthermore, according to embodiments of the present disclosure, a vehicle terminal includes: a communication unit configured to communicate with an authority server; a validation unit configured to transmit a user terminal inverse certificate request message to the authority server through the communication interface, obtain a user terminal inverse certificate from a message received from the authority server in response to the transmitted user terminal inverse certificate request message, and validate a vehicle terminal inverse certificate received in exchange for the user terminal inverse certificate from the user terminal; and a Bluetooth communication unit configured to pair with the user terminal when the vehicle terminal inverse certificate is validated, and perform Bluetooth communication with the paired user terminal.

Furthermore, according to embodiments of the present disclosure, a non-transitory computer readable recording medium containing program instructions for performing secure Bluetooth communication between a vehicle terminal and a user terminal includes: program instructions that transmit a user terminal inverse certificate request message to an authority server; program instructions that receive a message from the authority server in response to the transmission of the user terminal inverse certificate request message; program instructions that obtain a user terminal inverse certificate from the message received from the authority server; program instructions that receive a vehicle terminal inverse certificate from the user terminal in exchange for the user terminal inverse certificate; program instructions that validate the vehicle terminal inverse certificate; program instructions that pair with the user terminal when the vehicle terminal inverse certificate is validated; and program instructions that perform Bluetooth communication with the paired user terminal.

Furthermore, according to embodiments of the present disclosure, an authority server for supporting secure Bluetooth communication between a vehicle terminal and a user terminal includes: an account management unit configured to generate a user account based on information associated with the user terminal and the vehicle terminal received through a Bluetooth security app, provided by the authority server from the user terminal, and generate a server public key and a server private key for the user account, and an inverse certificate generation unit configured to generate a user terminal inverse certificate, in response to a user terminal inverse certificate request message received from the vehicle terminal, and a vehicle terminal inverse certificate, in response to a vehicle terminal inverse certificate request message received from the user terminal, and encrypt the user terminal inverse certificate and the vehicle terminal inverse certificate, respectively, with the server private key for transmitting respective encrypted messages to the vehicle terminal and the user terminal.

BRIEF DESCRIPTION OF THE DRAWINGS

The above and other objects, features and advantages of the present disclosure will be more apparent from the following detailed description taken in conjunction with the accompanying drawings, in which like reference characters may refer to the same or similar parts throughout the different views. The drawings are not necessarily to scale, emphasis instead being placed upon illustrating the principles of the embodiments of the disclosure.

DETAILED DESCRIPTION

Figure 1:
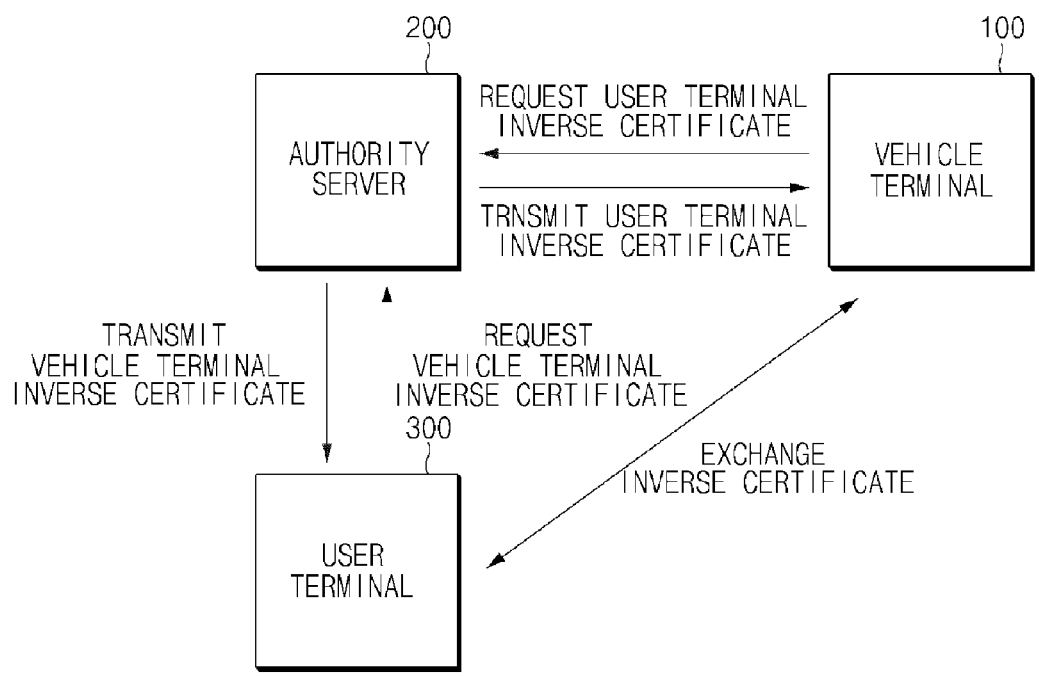
FIG. 1 is a configuration diagram of a system for performing secure Bluetooth communication according to embodiments of the present disclosure.

Hereinafter, the present disclosure will be described with reference to the accompanying drawings. In each drawing, like components are denoted by like reference numerals. Further, the detailed description of known functions and/or components will be omitted. The following disclosed contents mainly describe portions required to understand operations according to embodiments and the description of elements which make the gist of the description obscure will be omitted.

Further, some of components of the drawings may be exaggerated, omitted, or schematically illustrated. A size of each component does not completely reflect a real size and therefore the contents disclosed herein are not limited by a relative size or interval of the components illustrated in the drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the control unit, such as the vehicle terminal 100, for example.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 is a configuration diagram of a system for performing secure Bluetooth communication according to embodiments of the present disclosure. Referring to FIG. 1, the system for performing secure Bluetooth communication may include a vehicle terminal 100, an authority server 200 and a user terminal 300 for performing secure Bluetooth communication.

In the present disclosure, only components involved in embodiments of the present disclosure will be described to prevent features of embodiments of the present disclosure from obscuring. Therefore, a person having ordinary skill in the art to which the present disclosure pertains may understand that other general-purpose components in addition to components illustrated in FIG. 1 may be further provided.

A terminal according to embodiments may include a cell phone, a smartphone, a tablet personal computer (PC), a notebook computer, a terminal for digital broadcast, a digital camera, a portable game terminal, a personal digital assistant (PDA), a portable multimedia player (PMP), a navigator and a printer provided with the camera module 110. However, the terminal is not limited thereto, and may include any data communication device or multimedia device and an application device therefor.

The vehicle terminal 100 may request a user terminal inverse certificate to the authority server 200. According to embodiments, the vehicle terminal 100 may transmit an encrypted message requesting the user terminal inverse certificate to the authority server 200 for security. For example, the vehicle terminal 100 may encrypt the request with a shared secure key, such as a server public key.

Furthermore, according to embodiments, the vehicle terminal 100 may concatenate the encrypted message with a temporary server ID for security. The authority server 200 may generate the user terminal inverse certificate in response to the request of the vehicle terminal 100. And then, the authority server 200 may transmit the generated user terminal inverse certificate to the vehicle terminal 100. According to embodiments, the authority server 200 may encrypt the generated user terminal inverse certificate for security and transmit the encrypted message including the user terminal inverse certificate to the vehicle terminal 100. Furthermore, according to embodiments, the authority server 200 may concatenate the encrypted message including the user terminal inverse certificate with a temporary vehicle terminal ID for security.

Similarly, the user terminal 300 may request a vehicle terminal inverse certificate to the authority server 200. According to embodiments, the user terminal 300 may transmit an encrypted message requesting the vehicle terminal inverse certificate to the authority server 200 for security. For example, the user terminal 300 may encrypt the request with a shared secure key, such as a server public key. Furthermore, according to embodiments, the user terminal 300 may concatenate the encrypted message with a temporary server ID for security. The authority server 200 may generate the vehicle terminal inverse certificate in response to the request of the user terminal 300. And then, the authority server 200 may transmit the generated vehicle terminal inverse certificate to the user terminal 300. According to embodiments, the authority server 200 may encrypt the generated vehicle terminal inverse certificate for security and transmit the encrypted message including the vehicle terminal inverse certificate to the user terminal 300. Furthermore, according to embodiments, the authority server 200 may concatenate the encrypted message including the vehicle terminal inverse certificate with a temporary user terminal ID for security.

And then, the vehicle terminal 100 and the user terminal 300 may exchange the inverse certificates respectively received from the authority server 200 for validating each other. That is, the vehicle terminal 100 may receive the vehicle terminal inverse certificate from the user terminal 300 in exchange for the user terminal inverse certificate. Also, the user terminal 300 may receive the user terminal inverse certificate from the vehicle terminal 100 in exchange for the vehicle terminal inverse certificate. If the exchanged inverse certificates are validated respectively in the vehicle terminal 100 and the user terminal 300, the vehicle terminal 100 and the user terminal 300 may be paired for performing secure Bluetooth communication. The acquisition of the inverse certificates respectively in the vehicle terminal 100 and the user terminal 300 will be described in detail with reference to FIG. 3.

As described above, the system for performing secure Bluetooth communication may provide a secure means for 2-way communication between the vehicle terminal 100 and the user terminal 300. According to embodiments of the present disclosure, application source for 2-way communication may be embedded beyond the frame-ware of the user terminal 300. In the system, the lower level software may be programmed into the user terminal 300 at the manufacturing process of the user terminal 300. And then, a top level app may be downloaded into the user terminal 300 from the authority server 200, and installation of the application may be completed. Through this system, all messages being transmitted/received through the application will be encrypted.

Figure 2:
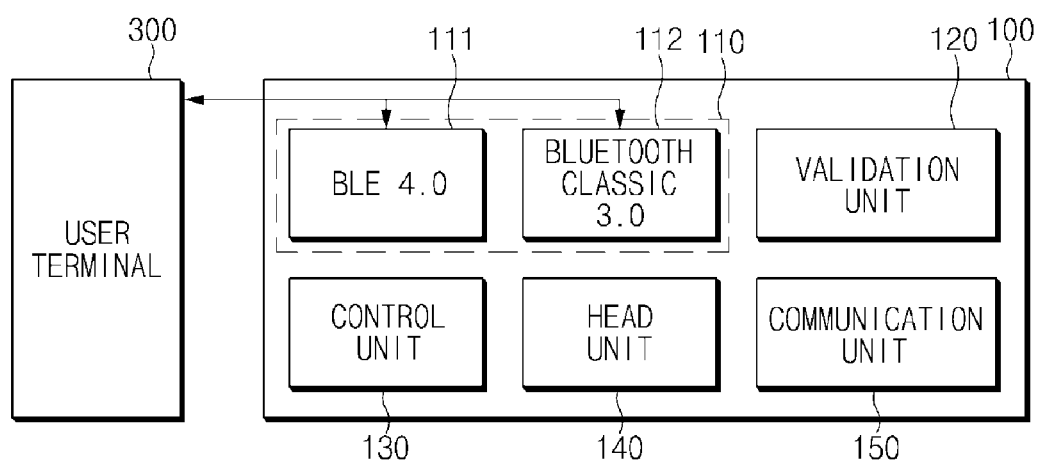
FIG. 2 is a configuration diagram for describing an operation of performing secure Bluetooth communication between the vehicle terminal and the user terminal according to embodiments of the present disclosure.

FIG. 2 is a configuration diagram of a vehicle terminal 100 and a user terminal 300 for performing secure Bluetooth communication according to embodiments of the present disclosure.

Referring to FIG. 2, the vehicle terminal 100 may include a Bluetooth communication unit 110, a validation unit 120, a control unit 130, a head unit 140, and a communication unit 150. The vehicle terminal 100 and the user terminal 300 illustrated in FIG. 2 may correspond to the vehicle terminal 100 and the user terminal 300 illustrated in FIG. 1. Therefore, the overlapping description thereof will be omitted.

The Bluetooth communication unit 110 may perform paring with the user terminal 300 if the vehicle terminal inverse certificate is validated. The Bluetooth communication unit 110 may perform Bluetooth communication with the paired user terminal 300. Accordingly, Bluetooth communication may be performed between the vehicle terminal 100 and user terminal 300.

According to embodiments of the present disclosure, the Bluetooth communication unit 110 may include a BLE (Bluetooth low energy) 4.0 controller 111 and a Bluetooth Classic 3.0 controller 112. However, the present disclosure is not limited thereto, and any one controller may be used.

As described above, the vehicle terminal 100 and the user terminal 300 may perform secure Bluetooth communication through the validation of the exchanged inverse certificates. If the validation of the exchanged inverse certificates is succeeded, the user terminal 300 may initially pair with the BLE 4.0 controller 111 in Bluetooth communication unit 110 of the vehicle terminal 100. And then, the BLE 4.0 controller 111 may transmit an authorized signal to the Bluetooth Classic 3.0 controller 112 after the initial pairing is authorized by the BLE 4.0 controller 111. In this way, the Bluetooth Classic 3.0 controller 112 may also communicate with the user terminal 300. According to embodiments of the present disclosure, the initial pairing may be encrypted through a rolling code generator. Furthermore, according to embodiments of the present disclosure, the Bluetooth Classic 3.0 controller may encrypt all messages with a vehicle terminal private key and transmit the encrypted messages to the user terminal 300.

The Bluetooth communication unit 110 may provide secure Bluetooth communication both for the control unit 130 and the head unit 140.

The validation unit 120 may validate a vehicle terminal inverse certificate received from the user terminal 300 in exchange for the user terminal inverse certificate. According to embodiments, the validation unit 120 may validate the received vehicle terminal inverse certificate using the vehicle terminal private key. Furthermore, according to embodiments, the validation unit 120 may obtain a user terminal public key through decryption of the received vehicle terminal inverse certificate.

The validation unit 120 may receive a server public key from the authority server 200 through the communication unit 150 during setup of a telematics service on the vehicle terminal 100. For example, the validation unit 120 may encrypt a user terminal inverse certificate request with the server public key. Or, the validation unit 120 may decrypt a received message, encrypted with a server private key, with the server public key.

The validation unit 120 may generate a vehicle terminal public key and a vehicle terminal private key. For example, the validation unit 120 may decrypt a received message, encrypted with a vehicle terminal public key, with the vehicle terminal private key.

The validation unit 120 may transmit a user terminal inverse certificate request message to the authority server 200 through the communication unit 150. According to embodiments of the present disclosure, the validation unit 120 may encrypt a user terminal inverse certificate request with the server public key. According to embodiments of the present disclosure, the validation unit 120 may concatenate the encrypted message including the user terminal inverse certificate request with a temporary server ID such as a server anonymous ID.

The validation unit 120 may receive a message from the authority server 200 in response to the transmitting of the user terminal certificate request message. If the message is encrypted with the server private key and the vehicle terminal public key, the validation unit 120 may decrypt the message with the server public key and the vehicle terminal private key, thereby, obtaining a user terminal inverse certificate from the message.

The control unit 130 may control the overall system of the vehicle terminal 100. According to embodiments, the control unit 130 may control at least one part of the overall system on the basis of commands received from the user terminal 130. The control unit 130 may receive commands from the vehicle terminal 100 or the user terminal 300.

The head unit 140 may include a microphone, a speaker, a display, or a user input. According to embodiments, contents included in the user terminal 300 may be output through the head unit 140 of the vehicle terminal.

The communication unit 150 may perform communication with an authority server 200. For example, the communication unit 150 may be connected to the network through wireless communication or wired communication and communicate with the authority server 200. The wireless communication may include at least one of, for example, wireless fidelity (Wi-Fi), near field communication (NFC), GPS, or cellular communication. The wired communication may include at least one of, for example, universal serial bus (USB), recommended standard (RS)-232, and plain old telephone service (POTS).

According to embodiments of the present disclosure, the vehicle terminal may utilize personal information included in the user terminal 300 for media streaming, vehicle control, and vehicle monitoring in the vehicle terminal 100. Also, when comparing with a conventional Bluetooth system, more amounts of capabilities is able to be streamed between the vehicle terminal 100 and the user terminal 300 due to secure Bluetooth communication.

Figure 3:
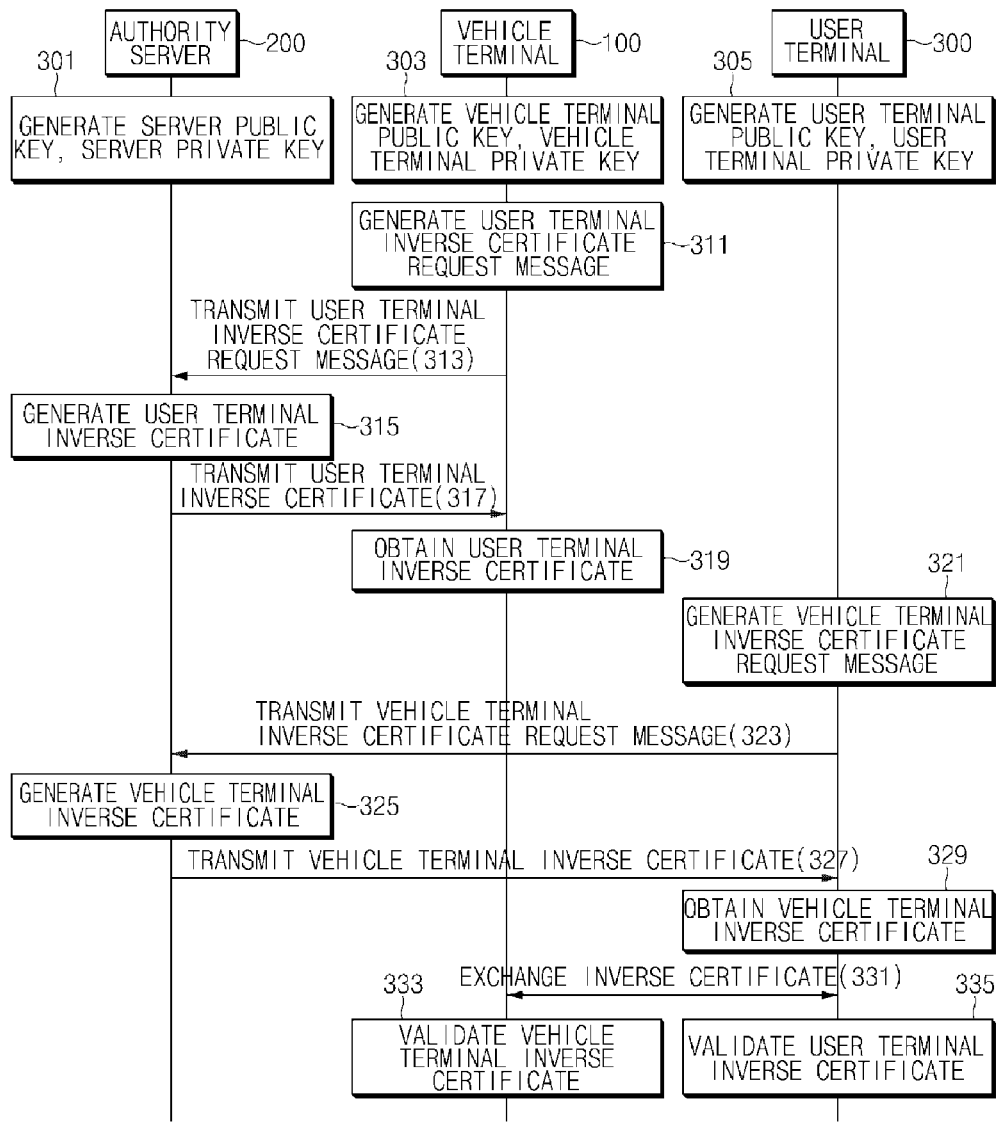
FIG. 3 is a first flow chart of a method for performing secure Bluetooth communication according to embodiments of the present disclosure.

FIG. 3 is a first flow chart of a method for performing secure Bluetooth communication according to embodiments of the present disclosure. The flow chart illustrated in FIG. 6 may include steps which are processed in time series by the user terminal 300 illustrated in FIGS. 1 to 2. Therefore, even though omitted hereinafter, the contents described above regarding the user terminal 300 illustrated in FIGS. 1 to 2 may be applied to the flow chart illustrated in FIG. 6.

In steps 301 to 305, the vehicle terminal 100, the authority server 200, and the user terminal 300 may generate its own public key and its own private key, respectively. For example, in the authority server 200, a server public key ($PU_S$) and a server private key ($PR_S$) may be generated. In the vehicle terminal 100, a vehicle terminal public key ($PU_C$) and a vehicle terminal private key ($PR_C$) may be generated. In the user terminal 300, a user terminal public key ($PU_{SMn}$) and a user terminal private key ($PR_{SMn}$) may be generated (n: user terminal identification number). The server public key ($PU_S$) may be transmitted to the vehicle terminal 100 and the user terminal 300 during setup or installation. The authority server 200 may receive the vehicle terminal public key ($PU_C$) generated in the vehicle terminal 100, and the user terminal public key ($PU_{SMn}$) generated in the user terminal 300.

In step 311, the vehicle terminal 100 may generate a user terminal inverse certificate request message. For example, the vehicle terminal 100 may encrypt a user terminal inverse certificate request ($SM_{n\text{-}Cert\ Req}$) with the server public key ($PU_S$). A message ($E[PU_S, SM_{n\text{-}Cert\ Req}]$) generated through encryption may be concatenated with a temporary server ID ($A\text{-}ID_S$). Accordingly, the user terminal inverse certificate request message ($E[PU_S, SM_{n\text{-}Cert\ Req}]\|A\text{-}ID_S$) may be generated through the encryption and the concatenation.

In step 313, the vehicle terminal 100 may transmit the user terminal inverse certificate request message to the authority server 200. In the above example, the user terminal inverse certificate request message ($E[PU_S, SM_{n\text{-}Cert\ Req}]\|A\text{-}ID_S$) generated through the encryption and the concatenation may be transmitted to the authority server 200 for security.

In step 315, the authority server 200 may generate a user terminal inverse certificate. For security, the authority server 200 may encrypt the generated user terminal inverse certificate ($SM_{n\text{-}Cert}$) with the vehicle public key ($PU_C$) and the server private key ($PR_S$) and concatenate a message ($E[PR_S, E(PU_C, SM_{n\text{-}Cert})]$) generated through the encryption with a temporary vehicle terminal ID ($A\text{-}ID_C$). Accordingly, a message ($E[PR_S, E(PU_C, SM_{n\text{-}Cert})]\|A\text{-}ID_C$) including the user terminal inverse certificate may be generated through the encryption and the concatenation.

In step 317, the authority server 200 may transmit the user terminal inverse certificate to the vehicle terminal 100. In the above example, the message ($E[PR_S, E(PU_C, SM_{n\text{-}Cert})]\|A\text{-}ID_C$) generated through the encryption and the concatenation may be transmitted to the vehicle terminal 100 for security.

In step 319, the vehicle terminal 100 may obtain the user terminal inverse certificate. In the above example, the vehicle terminal 100 may decrypt the message ($E[PR_S, E(PU_C, SM_{n\text{-}Cert})]\|A\text{-}ID_C$) received from the authority server 200 with the server public key ($PU_S$) and the vehicle terminal private key ($PR_C$), thereby obtaining the user terminal inverse certificate ($SM_{n\text{-}Cert}$). According to embodiments, steps 311 to 319 may be changed with steps 321 to 327 in order.

In step 321, the user terminal 300 may generate a vehicle terminal inverse certificate request message. Similarly, as an example, the user terminal 300 may encrypt a vehicle terminal inverse certificate request ($C_{Cert\ Req}$) with the server public key ($PU_S$). A message ($E[PU_S, C_{cert\ Req}]$) generated through encryption may be concatenated with a temporary server ID ($A\text{-}ID_S$). Accordingly, the user terminal inverse certificate request message ($E[PU_S, C_{Cert\ Req}]\|A\text{-}ID_S$) may be generated through the encryption and the concatenation.

In step 323, the user terminal 300 may transmit the vehicle terminal inverse certificate request message to the authority server 200. In the above example, the vehicle terminal inverse certificate request message ($E[PU_S, C_{Cert\ Req}]\|A\text{-}ID_S$) generated through the encryption and the concatenation may be transmitted to the authority server 200 for security.

In step 325, the authority server 200 may generate a vehicle terminal inverse certificate. For security, the authority server 200 may encrypt the generated vehicle terminal inverse certificate ($C_{Cert}$) with the user public key ($PU_{SMn}$) and the server private key ($PR_S$) and concatenate a message ($E[PR_S, E(PU_{SMn}, C_{Cert})]$) generated through the encryption with a temporary user terminal ID ($A\text{-}ID_S$). Accordingly, a message ($E[PR_S, E(PU_{SMn}, C_{Cert})]\|A\text{-}ID_{SMn}$) including the vehicle terminal inverse certificate may be generated through the encryption and the concatenation.

In step 327, the authority server 200 may transmit the vehicle terminal inverse certificate to the user terminal 100. In the above example, the message ($E[PR_S, E(PU_{Smn}, C_{Cert})]\|A\text{-}ID_{SMn}$) generated through the encryption and the concatenation may be transmitted to the user terminal 300 for security.

In step 329, the user terminal 300 may obtain the vehicle terminal inverse certificate. In the above example, the user terminal 300 may decrypt the message ($E[PR_S, E(PU_{SMn}, C_{Cert})]\|A\text{-}ID_{SMn}$) received from the authority server 200 with the server public key ($PU_S$) and the user terminal private key ($PR_{SMn}$), thereby obtaining the vehicle terminal inverse certificate ($C_{Cert}$).

In step 331, the vehicle terminal 100 and the user terminal 300 may exchange the inverse certificates with each other. That is, the vehicle terminal 100 may receive the vehicle terminal inverse certificate ($C_{Cert}$) from the user terminal 300 and the user terminal 300 may receive the user terminal inverse certificate ($SM_{n\text{-}Cert}$) from the vehicle terminal 100.

In steps 333 and 335, the vehicle terminal 100 and the user terminal 300 may validate the vehicle terminal inverse certificate ($C_{Cert}$) and the user terminal inverse certificate ($SM_{n\text{-}cert}$), respectively. According to embodiments, the vehicle terminal 100 may validate the vehicle terminal inverse certificate ($C_{cert}$) using the vehicle terminal private key ($PR_C$) and obtain a user terminal public key ($PU_{SMn}$) through decryption of the vehicle terminal inverse certificate ($C_{Cert}$). Similarly, the user terminal 300 may validate the user terminal inverse certificate ($SM_{n\text{-}Cert}$) using the user terminal private key ($PR_{SMn}$) and obtain a vehicle terminal public key ($PU_C$) through decryption of the user terminal inverse certificate ($SM_{n-Cert}$).

According to embodiments of the present disclosure, after m times of uses, new inverse certificates for both the vehicle terminal 100 and the user terminal 300 may be generated by the authority server 200. Accordingly, the time expiration condition may be added to the generated inverse certificates ($Sm_{n-Cert}$=(E[$PU_{SMn}$, ($PU_C$, A-$ID_{SMn}$, A-$ID_C$, Time, Expiration)], $C_{cert}$=(E[$PU_C$, ($PU_{SMn}$, A-$ID_C$, A-$ID_{SMn}$, Time, Expiration)])

Figure 4:
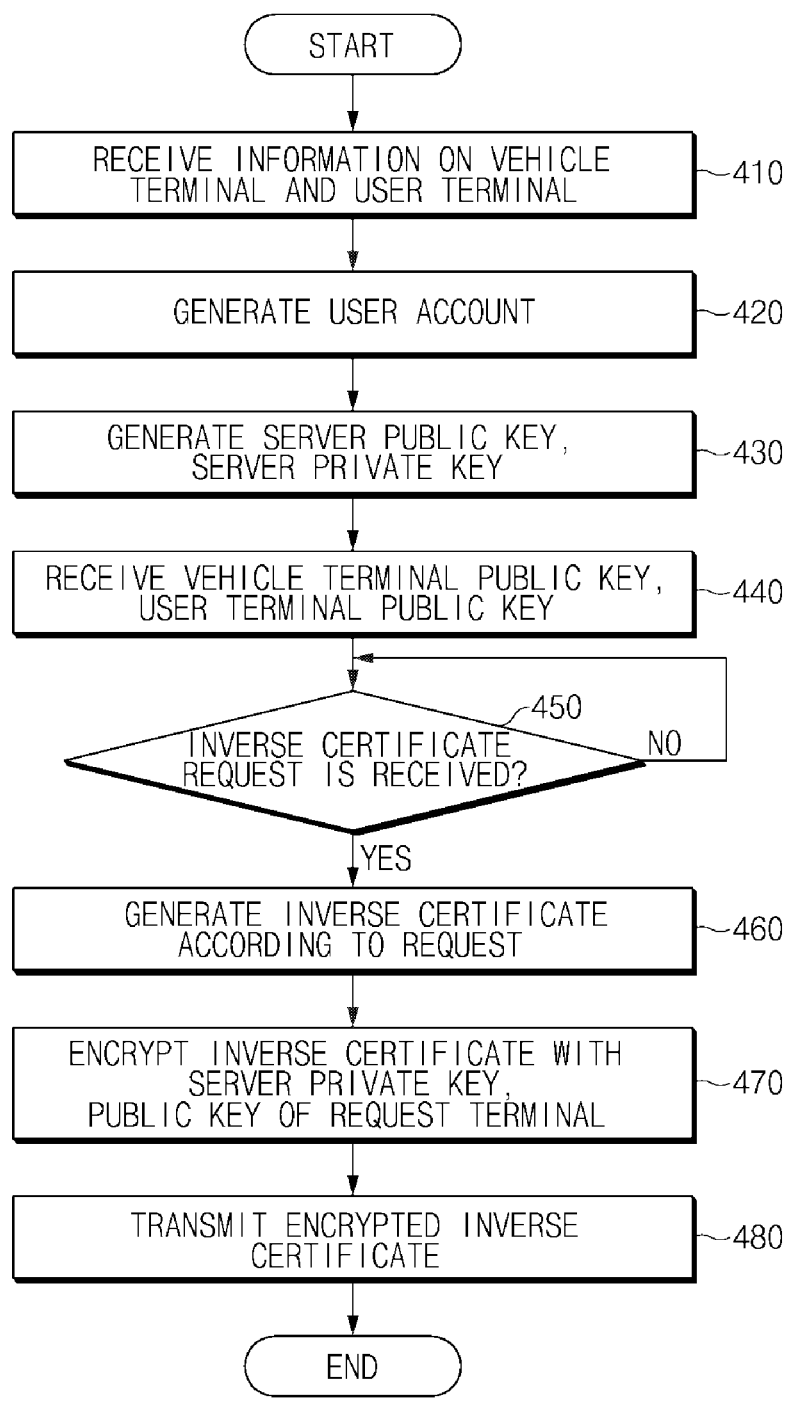
FIG. 4 is a second flow chart of a method for performing secure Bluetooth communication according to embodiments of the present disclosure.

FIG. 4 is a second flow chart of a method for performing secure Bluetooth communication according to embodiments of the present disclosure. The flow chart illustrated in FIG. 4 may include steps which are processed in time series by the authority server 200 illustrated in FIG. 1. Therefore, even though omitted hereinafter, the contents described above regarding the authority server 200 illustrated in FIG. 1 may be applied to the flow chart illustrated in FIG. 4.

In step 410, the authority server 200 may receive information on the vehicle terminal 100 and the user terminal 300. For example, the user may input information on the vehicle terminal 100 and the user terminal 300 during registration on a website of the authority server 200.

In step 420, the authority server 200 may generate a user account on the basis of the received information. As a result of the registration of the website, the user account may be created. When the user downloads a Bluetooth security app from the authority server 200, only an access on the website using the registered user terminal is allowable.

In step 430, the authority server 200 may generate a server public key and a server private key.

In step 440, the authority server 200 may receive a vehicle terminal public key and a user terminal public key respectively from the vehicle terminal 100 and the user terminal 300.

In step 450, the authority server 200 may check whether an inverse certificate request is received from the vehicle terminal 100 or the user terminal 300. The authority server 200 may proceed to step 460 when an inverse certificate request is received. Otherwise, the authority server 200 may preform step 450 repeatedly for checking whether an inverse certificate request is received from the vehicle terminal 100 or the user terminal 300.

In step 460, the authority server 200 may generate an inverse certificate according to the request from the vehicle terminal 100 or the user terminal 300.

In step 470, the authority server 200 may encrypt an inverse certificate with a server private key and a public key of the request terminal (the vehicle terminal 100 or the user terminal 300).

In step 480, the authority server 200 may transmit the encrypted inverse certificate to the vehicle terminal 100 or the user terminal 300.

Figure 5:
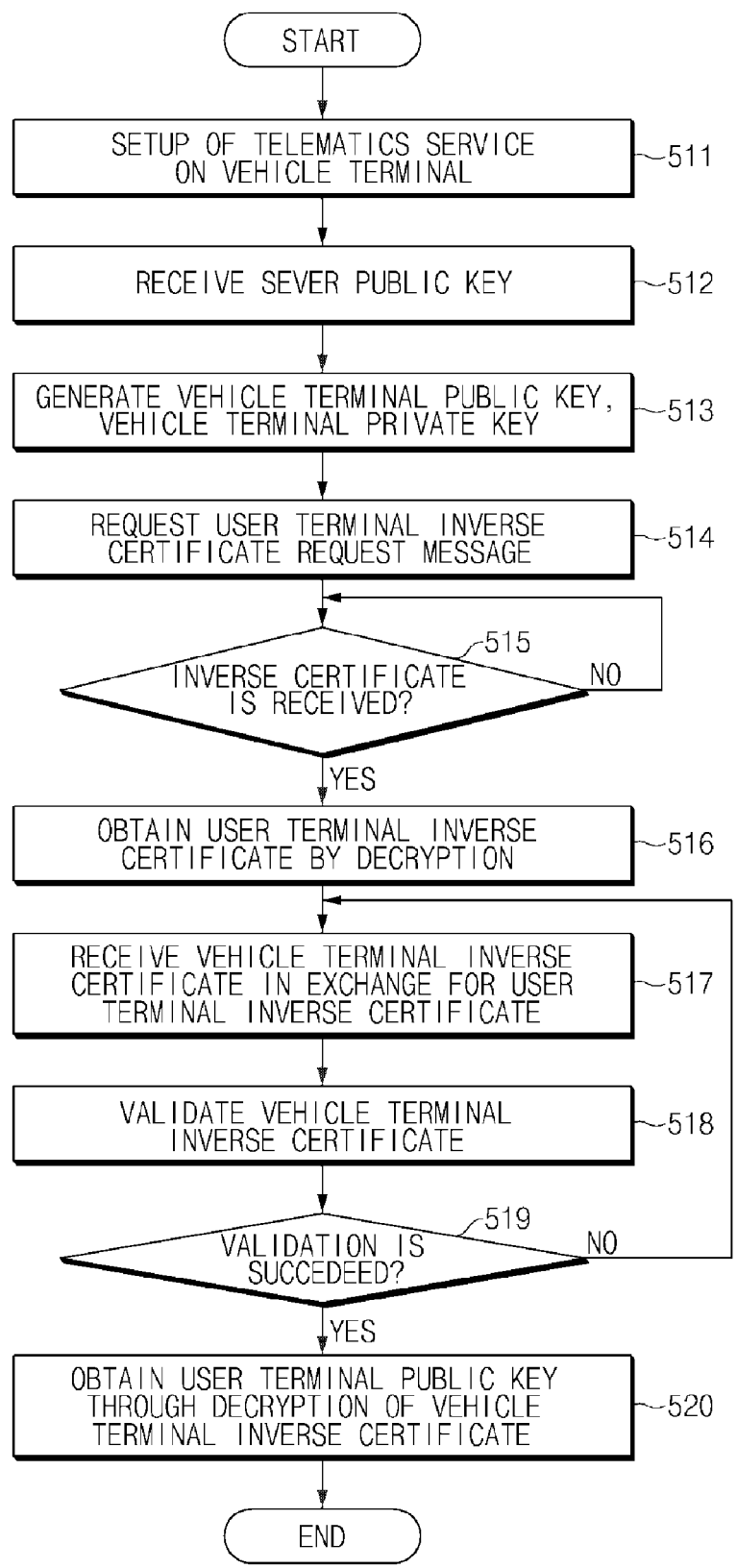
FIG. 5 is a third flow chart of a method for performing secure Bluetooth communication according to embodiments of the present disclosure.

FIG. 5 is a third flow chart of a method for performing secure Bluetooth communication according to embodiments of the present disclosure. The flow chart illustrated in FIG. 5 may include steps which are processed in time series by the vehicle terminal 100 illustrated in FIGS. 1 to 2. Therefore, even though omitted hereinafter, the contents described above regarding the vehicle terminal 100 illustrated in FIGS. 1 to 2 may be applied to the flow chart illustrated in FIG. 5.

In step 511, the vehicle terminal 100 may setup a telematics service on the vehicle terminal 100.

In step 512, the vehicle terminal 100 may receive a server public key from the authority server 200 during the setup of the telematics service. That is, the server public key may be shared between the authority server 200 and the vehicle terminal 100.

In step 513, the vehicle terminal 100 may generate a vehicle terminal public key and a vehicle terminal private key.

In step 514, the vehicle terminal 100 may request the user terminal inverse certificate request message.

In step 515, the vehicle terminal 100 may check whether a user terminal inverse certificate is received. The vehicle terminal 100 may proceed to step 516 when a user terminal inverse certificate is succeeded. Otherwise, the vehicle terminal 100 may preform step 515 repeatedly for checking whether a user terminal inverse certificate is received from the authority server 200.

In step 516, the vehicle terminal 100 may obtain the user terminal inverse certificate by decryption of the received message from the authority server 200.

In step 517, the vehicle terminal 100 may receive a vehicle terminal inverse certificate from the user terminal 300 in exchange for the user terminal inverse certificate.

In step 518, the vehicle terminal 100 may validate the vehicle terminal inverse certificate.

In step 519, the vehicle terminal 100 may check whether the validation of the vehicle terminal inverse certificate is succeeded. The vehicle terminal 100 may proceed to step 520 when the validation is succeeded. Otherwise, the vehicle terminal 100 may return to step 517 for receiving new vehicle terminal inverse certificate from the user terminal 300.

In step 520, the vehicle terminal 100 may obtain a user terminal public key through decryption of the vehicle terminal inverse certificate.

Figure 6:
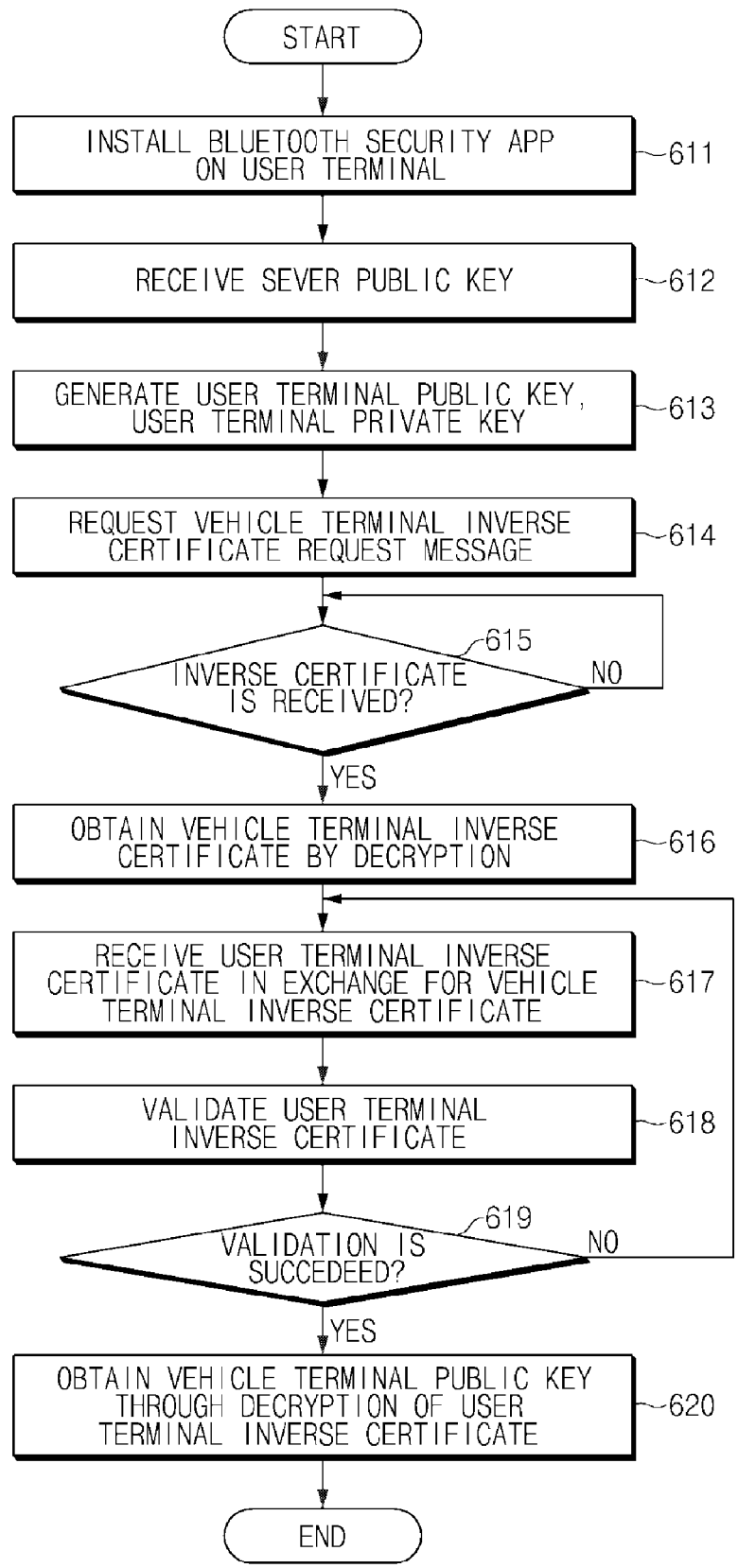
FIG. 6 is a fourth flow chart of a method for performing secure Bluetooth communication according to embodiments of the present disclosure.

FIG. 6 is a fourth flow chart of a method for performing secure Bluetooth communication according to embodiments of the present disclosure. The flow chart illustrated in FIG. 6 may include steps which are processed in time series by the user terminal 300 illustrated in FIGS. 1 to 2. Therefore, even though omitted hereinafter, the contents described above regarding the user terminal 300 illustrated in FIGS. 1 to 2 may be applied to the flow chart illustrated in FIG. 6.

In step 611, the user terminal 300 may install a Bluetooth security app on the user terminal 300.

In step 612, the user terminal 300 may receive a server public key from the authority server 200 during the installation of the Bluetooth security app. That is, the server public key may be shared between the authority server 200 and the user terminal 300.

In step 613, the user terminal 300 may generate a user terminal public key and a user terminal private key.

In step 614, the user terminal 300 may request the vehicle terminal inverse certificate request message to the authority server 200.

In step 615, the user terminal 300 may check whether a vehicle terminal inverse certificate is received. The user terminal 300 may proceed to step 616 when the vehicle terminal inverse certificate is received. Otherwise, the user terminal 300 may preform step 615 repeatedly for checking whether a vehicle terminal inverse certificate is received from the authority server 200.

In step 616, the user terminal 300 may obtain the vehicle terminal inverse certificate by decryption of the message received from the authority server 200.

In step 617, the user terminal 300 may receive a user terminal inverse certificate from the vehicle terminal 100 in exchange for the vehicle terminal inverse certificate.

In step 618, the user terminal 300 may validate the user terminal inverse certificate.

In step 619, the user terminal 300 may check whether the validation of the user terminal inverse certificate is succeeded. The user terminal 300 may proceed to step 620 when the validation is succeeded. Otherwise, the user terminal 300 may return to step 617 for receiving new user terminal inverse certificate from the vehicle terminal 100.

In step 620, the user terminal 300 may obtain a vehicle terminal public key through decryption of the user terminal inverse certificate.

All embodiments and conditional examples disclosed in the present disclosure are described to help a person having ordinary skilled in the art to which the present disclosure pertains to understand the principle and concept of the present disclosure. Those skilled in the art will understand that the present disclosure may be implemented in a modified form within a range which does not deviate from the disclosed characteristics of the present disclosure. Therefore, the embodiments described above should be considered as an illustration, rather than a limitation. It should be interpreted that the scope of the present disclosure is defined by the following claims, rather than the above-mentioned detailed description, and all of differences within a scope equivalent thereto are included in the appended claims of the present disclosure.

What is claimed is:

1. A vehicle terminal for performing secure Bluetooth communication, comprising:
   a communication unit configured to communicate with an authority server;
   a validation unit configured to transmit a user terminal inverse certificate request message to the authority server through the communication unit, obtain a user terminal inverse certificate from a message received from the authority server in response to the transmitted user terminal inverse certificate request message, and validate a vehicle terminal inverse certificate received from the user terminal in exchange for the user terminal inverse certificate; and
   a Bluetooth communication unit configured to pair with the user terminal when the vehicle terminal inverse certificate is validated, and perform Bluetooth communication with the paired user terminal.

2. The vehicle terminal of claim 1, wherein the validation unit is configured to receive a server public key from the authority server through the communication unit during setup of a telematics service, and generate a vehicle terminal public key and a vehicle terminal private key.

3. The vehicle terminal of claim 2, wherein the user terminal inverse certificate request message is encrypted with the received server public key.

4. The vehicle terminal of claim 3, wherein the user terminal inverse certificate request message is concatenated with a temporary server ID.

5. The vehicle terminal of claim 2, wherein the message received from the authority server is encrypted with a server private key and the vehicle terminal public key.

6. The vehicle terminal of claim 5, wherein the message received from the authority server is concatenated with a temporary vehicle terminal ID.

7. The vehicle terminal of claim 5, wherein the validation unit is configured to obtain the user terminal inverse certificate by decrypting the message from the authority server with the vehicle terminal private key.

8. The vehicle terminal of claim 2, wherein the validation unit is configured to validate the received vehicle terminal inverse certificate using the vehicle terminal private key.

9. The vehicle terminal of claim 2, wherein the validation unit is configured to obtain a user terminal public key through decryption of the received vehicle terminal inverse certificate.

10. An authority server for supporting secure Bluetooth communication between a vehicle terminal and a user terminal, comprising:
    an account management unit configured to generate a user account based on information associated with the user terminal and the vehicle terminal received through a Bluetooth security app, provided by the authority server from the user terminal, and generate a server public key and a server private key for the user account; and
    an inverse certificate generation unit configured to generate a user terminal inverse certificate, in response to a user terminal inverse certificate request message received from the vehicle terminal, and a vehicle terminal inverse certificate, in response to a vehicle terminal inverse certificate request message received from the user terminal, and encrypt the user terminal inverse certificate and the vehicle terminal inverse certificate, respectively, with the server private key for transmitting respective encrypted messages to the vehicle terminal and the user terminal.

11. The authority server of claim 10, wherein the account management unit is configured to receive a user terminal public key from the user terminal during installation of the Bluetooth security app on the user terminal and a vehicle terminal public key from the vehicle terminal during setup of a telematics service on the vehicle terminal.

12. The authority server of claim 10, wherein the inverse certificate generation unit is configured to encrypt the user terminal inverse certificate with the server private key and a vehicle terminal public key, and the vehicle terminal inverse certificate with the server private key and a user terminal public key.

13. The authority server of claim 12, wherein the inverse certificate generation unit is configured to concatenate messages generated through the encryption of the user terminal inverse certificate and the vehicle terminal inverse certificate with a temporary vehicle terminal ID and a temporary user terminal ID, respectively, and transmit the concatenated messages to the vehicle terminal and the user terminal, respectively.

14. The authority server of claim 10, wherein the user terminal inverse certificate request message is encrypted with the server public key, and the inverse certificate generation unit is configured to decrypt the user terminal inverse certificate request message with the server private key.

15. The authority server of claim 10, wherein the vehicle terminal inverse certificate request message is encrypted with the server public key, and the inverse certificate generation unit is configured to decrypt the vehicle terminal inverse certificate request message with the server private key.

16. A method for performing secure Bluetooth communication between a vehicle terminal and a user terminal, comprising:
    transmitting, by a vehicle terminal, a user terminal inverse certificate request message to an authority server;
    receiving, at the vehicle terminal, a message from the authority server in response to the transmission of the user terminal inverse certificate request message;

obtaining, by the vehicle terminal, a user terminal inverse certificate from the message received from the authority server;

receiving, at the vehicle terminal, a vehicle terminal inverse certificate from the user terminal in exchange for the user terminal inverse certificate;

validating, by the vehicle terminal, the vehicle terminal inverse certificate;

pairing, by the vehicle terminal, with the user terminal when the vehicle terminal inverse certificate is validated; and performing, by the vehicle terminal, Bluetooth communication with the paired user terminal.

17. The method of claim 16, wherein the transmitting of the user terminal inverse certificate request message includes:

encrypting the user terminal inverse certificate request message with a server public key;

concatenating the encrypted user terminal inverse certificate request message with a temporary server ID; and transmitting the encrypted user terminal inverse certificate request message concatenated with the temporary server ID to the authority server.

18. The method of claim 16, wherein the obtaining of the user terminal inverse certificate includes obtaining the user terminal inverse certificate by decrypting the message received from the authority server with a server public key and a vehicle terminal private key.

19. The method of claim 16, further comprising:

receiving, at the vehicle terminal, a server public key from the authority server through setup of a telematics service; and generating, by the vehicle terminal, a vehicle terminal public key and a vehicle terminal private key.

20. The method of claim 19, wherein the validating of the vehicle terminal inverse certificate includes:

validating the vehicle terminal inverse certificate using the vehicle terminal private key; and obtaining a user terminal public key through decryption of the vehicle terminal inverse certificate.

21. A non-transitory computer readable medium containing program instructions for performing secure Bluetooth communication between a vehicle terminal and a user terminal, the computer readable medium comprising:

program instructions that transmit a user terminal inverse certificate request message to an authority server;

program instructions that receive a message from the authority server in response to the transmission of the user terminal inverse certificate request message;

program instructions that obtain a user terminal inverse certificate from the message received from the authority server;

program instructions that receive a vehicle terminal inverse certificate from the user terminal in exchange for the user terminal inverse certificate;

program instructions that validate the vehicle terminal inverse certificate;

program instructions that pair with the user terminal when the vehicle terminal inverse certificate is validated; and program instructions that perform Bluetooth communication with the paired user terminal.

* * * * *